July 16, 1968     B. J. LECHNER ET AL     3,393,345
FERROELECTRIC CONTROL CIRCUITS
Filed Nov. 5, 1964     2 Sheets-Sheet 1
*Fig. 1.*
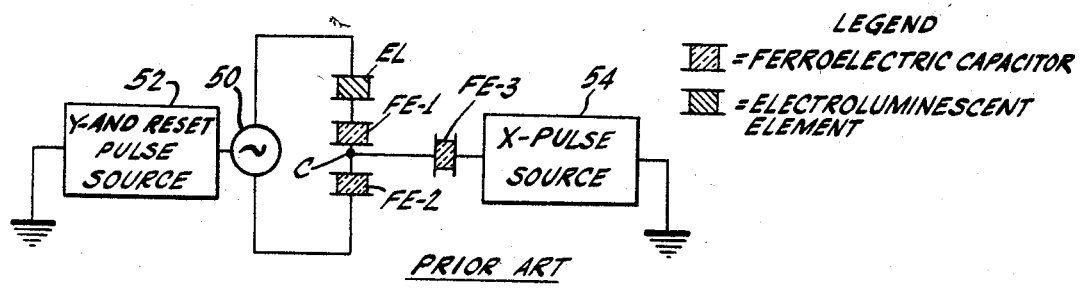
PRIOR ART
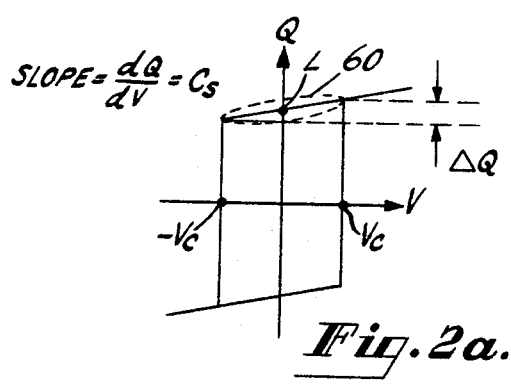
*Fig. 2a.*
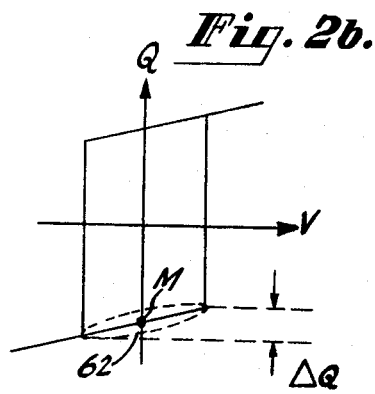
*Fig. 2b.*
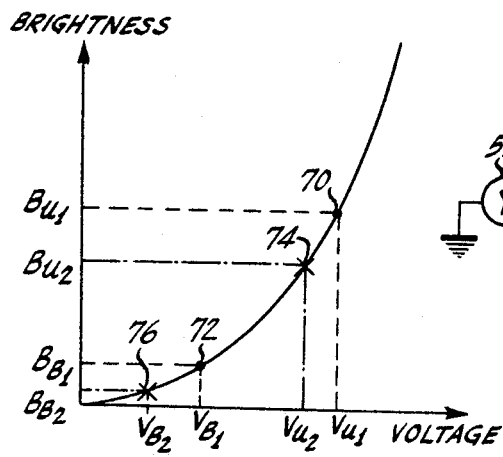
*Fig. 3.*
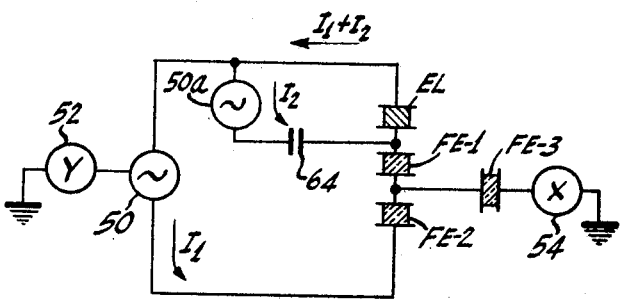
*Fig. 4.*
INVENTORS
BERNARD J. LECHNER &
BY GEORGE W. TAYLOR
*Attorney*

July 16, 1968
B. J. LECHNER ETAL
3,393,345
FERROELECTRIC CONTROL CIRCUITS
Filed Nov. 5, 1964
2 Sheets-Sheet 2
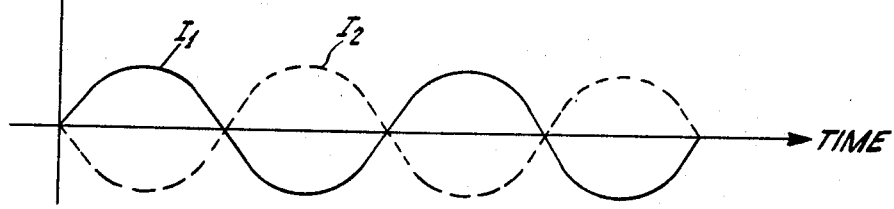
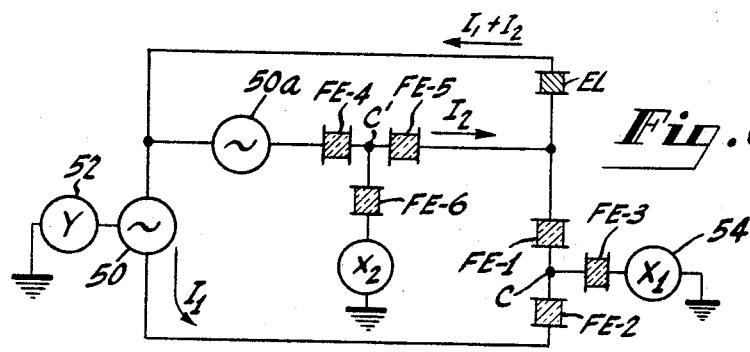
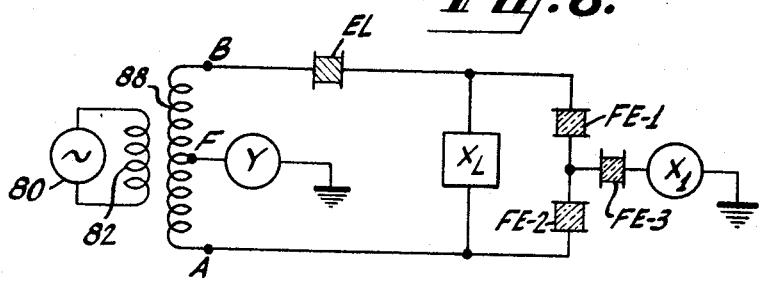
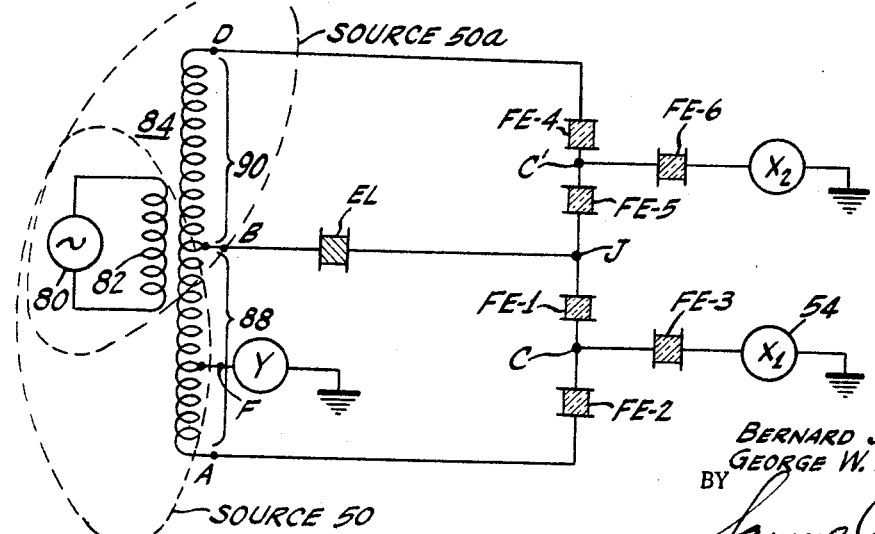
INVENTORS
BERNARD J. LECHNER &
GEORGE W. TAYLOR
BY
*Samuel Cohen*
Attorney United States Patent Office 3,393,345
Patented July 16, 1968

3,393,345
FERROELECTRIC CONTROL CIRCUITS
Bernard J. Lechner and George W. Taylor, Princeton, N.J., assignors to Radio Corporation of America, a corporation of Delaware
Filed Nov. 5, 1964, Ser. No. 409,095
1 Claim. (Cl. 315—166)

ABSTRACT OF THE DISCLOSURE

The voltage across a load, such as an electroluminescent element, is controlled by a circuit which includes capacitors, such as those of the ferroelectric type. The capacitors can assume a blocked (high impedance) or unblocked (low impedance) condition. In one of these conditions, a power supply applies a relatively high alternating voltage across the load and in the other, a relatively low alternating voltage across the load. A second alternating voltage, which is out-of-phase with and close in amplitude to the power supply voltage present across the load during one condition of the capacitors, is also applied to the load.

---

The present invention relates to ferroelectric control circuits which are useful in ferroelectric electroluminescent panel-type displays, such as mural television displays, in ferroelectric memories, and in other ferroelectric storage and control circuits.

When an electric field is applied to a ferroelectric material, the material exhibits a relationship between the polarization of its "bound charge" and the applied field in the general form of the hysteresis loop exhibited by ferromagnetic materials. "Bound charge" refers to the electric dipoles in the material. By utilizing the ferroelectric material as the dielectric of a capacitor, this hysteresis effect can be employed for the storage of binary information, for the control and switching of electric signals, and for other purposes. Circuits employing such storage elements are discussed in Patents Nos. 2,695,397 and 2,695,-398 to J. R. Anderson, and elsewhere in the literature.

A well-known ferroelectric control circuit, termed a "transcharger," which is useful in panel-type displays and elsewhere, is described in detail in Rajchman et al., Patent No. 2,900,622, issued Aug. 18, 1959. One arrangement of a transcharger shown in the patent includes three ferroelectric elements, two of which are essentially in series with an alternating voltage source and a load, such as an electroluminescent element. The third ferroelectric element is coupled between the common connection of the first two ferroelectric elements and the setting and resetting pulse circuits. In one condition of the transcharger, the two series-connected ferroelectric elements are polarized in opposite directions and "block" the transcharger. In the other condition of the transcharger, the two series-connected ferroelectric elements are polarized in the same direction and "unblock" the transcharger.

In the operation of a circuit such as discussed above, in one condition of the series-connected ferroelectric elements, the alternating voltage which develops across the load should be relatively high and, in the other condition of these elements, this voltage should be reduced to an insignificant value. But, in practical circuits, it is found difficult to reduce the minimum voltage which develops across the load to as low a value as desired. In the case of an electroluminescent load element, for example, the minimum voltage is still sufficient to produce light output of low intensity. This reduces the contrast ratio, defined as the maximum light intensity divided by the minimum light intensity, which it is possible to obtain from the electroluminescent element.

In the circuit of the present invention, the minimum voltage across the load is reduced by applying to the load an alternating voltage which is of the same amplitude as and 180° out-of-phase with the spurious alternating voltage applied to the load by the voltage source. While this out-of-phase voltage slightly reduces the maximum voltage which develops across the load and, in this way, slightly reduces the maximum light intensity produced in the case in which the load is an electroluminescent element, the substantial improvement in contrast ratio obtained more than compensates for this slight loss.

The invention is discussed in greater detail below and is shown in the accompanying drawings, of which:

FIGURE 1 is a block circuit diagram of a prior art transcharger circuit;

FIGURES 2a and 2b are somewhat idealized hysteresis loops of the series-connected ferroelectric elements FE-1 and FE-2 of FIGURE 1;

FIGURE 3 is a graph of voltage vs. brightness for an electroluminescent element;

FIGURE 4 is a schematic circuit diagram of a new and improved transcharger circuit;

FIGURE 5 is a drawing of waveforms to help explain the operation of the circuit of FIGURE 4;

FIGURE 6 is a schematic circuit diagram of a second embodiment of an improved transcharger circuit;

FIGURE 7 is another drawing of the circuit of FIGURE 6 showing additional details of the power supply; and FIGURE 8 is a schematic diagram of another embodiment of the invention.

Throughout the figures, similar reference numerals and characters are applied to similar parts.

The circuit of FIGURE 1 is an improved form of transcharger which is described in detail in copending application Ser. No. 328,090 now Patent No. 3,197,744, filed Dec. 4, 1963, by Bernard J. Lechner and assigned to the same assignee as the present application. The circuit includes an alternating voltage source 50 connected across the essentially series-connected electroluminescent element EL and ferroelectric elements FE-1 and FE-2. An X pulse source 54 is connected at one terminal to a point of reference voltage, such as ground, and at its other terminal through a third ferroelectric element FE-3 to the common junction C between the ferroelectric elements FE-1 and FE-2. The three ferroelectric elements may be of the same capacitance. A Y and reset pulse source 52 is connected between ground and the alternating voltage source 50.

A detailed discussion of the operation of the circuit of FIGURE 1 appears in the copending application above. In brief, when the reset pulse source 52 applies a relatively large amplitude pulse to the circuit, the ferroelectric elements FE-1 and FE-2 become oppositely polarized and block the circuit. In this condition of the circuit, the elements FE-1, FE-2 present a high impedance to source 50 and very little of the source voltage develops across the electroluminescent element EL. When the X pulse source 54 and Y pulse source 52 apply coincident pulses of opposite polarity to the circuit, the ferroelectric elements FE-1 and FE-2 become polarized in the same direction, thereby placing the circuit in the unblocked condition. In this condition, the two ferroelectric elements FE-1 and FE-2 present a low impedance to the source 50 and a substantial voltage develops across the electroluminescent element EL.

In the circuit of FIGURE 1, the X pulse source is of low internal impedance, and the source 50 is connected to ground at an appropriate point in its circuit so that the "bridge" 50, EL, FE-1, FE-2 is balanced. The point C therefore remains essentially at ground, both during the blocked and unblocked condition of the circuit. It is because of this that there is little tendency for the alternating source 50 spuriously to block or unblock the transcharger circuit.

As mentioned above, FIGURE 1 is a simplified showing. If desired, a second load element, such as a second electroluminescent element, may be employed in series with the second ferroelectric element FE-2, as shown in FIGURE 1 of the copending application. In a circuit of this type, the source 52 may be connected to the center tap of the source 50, as discussed in the application, to maintain the bridge in perfect balance. Or, a circuit may be employed such as shown in FIGURE 6 of the application. In the latter case, it is desirable to connect source 52 to a terminal of source 50 which is somewhat displaced from the center tap to maintain the bridge in balance, as discussed in detail in the application.

Somewhat idealized hysteresis loops for ferroelectric elements FE-1 and FE-2 appear in FIGURES 2a and 2b, respectively. Operating points L and M for the two ferroelectric elements, respectively, represent these elements polarized in opposite states and the transcharger therefore in a blocked condition. In this condition, the alternating voltage source drives the ferroelectric element FE-1 back and forth along the saturation region of its hysteresis loop, as indicated by dotted line 60 in FIGURE 2a. In a similar manner, the source 50 drives the ferroelectric element FE-2 along the lower saturation region of its hysteresis loop, as indicated by dotted line 62.

Since the hysteresis loops are not absolutely square, the saturation regions thereof just discussed are not absolutely parallel to the voltage axis. The slope of these regions is shown in the figures as $dQ/dV = C_s$, and the change in charge due to the alternating voltage is shown as $\Delta Q$. This charge $\Delta Q$ flows through the electroluminescent cell EL, and the voltage across the electroluminescent cell which result causes the cell to produce a light output of relatively low intensity.

The brightness B versus voltage V characteristic of a typical electroluminescent element appears in FIGURE 3. In the unblocked condition of the transcharger of FIGURE 1, a voltage $V_{U1}$ develops across the electroluminescent element, and this results in a light output $B_{U1}$. In the blocked condition of the transcharger, the charge $\Delta Q$ of FIGURE 2 causes a voltage $V_{B1}$ to develop across the electroluminescent element, and this results in a light output $B_{B1}$. The resulting contrast ratio is $B_{U1}/B_{B1}$ and, in a practical circuit which was operated, was found to be approximately 3-to-1. The respective brightnesses were 6 and 2 foot lamberts.

The contrast ratio above is substantially improved with the circuit of FIGURE 4. The transcharger circuit itself, as can be seen, is substantially identical with the one of FIGURE 1. However, a compensation circuit is added which consists of a second alternating voltage source 50a and capacitor 64, these two elements being connected across the electroluminescent element EL. The source 50a produces an output voltage which causes current flow $I_2$ through the electroluminescent element EL-1 which is 180° out-of-phase with and equal in amplitude to the current $I_1$ caused by source 50. The voltage thus developed across the electroluminescent element EL during the blocked condition of the transcharger will then be substantially zero.

While shown as separate sources, 50 and 50a, it is to be understood that there is synchronization between these two sources. In practice, the source 50 may include a primary winding and a secondary winding, and the source 50a may include a second secondary winding coupled to the same primary winding as the secondary winding in source 50. By appropriately connecting the leads for this second secondary winding and employing the proper number of turns, a voltage of correct phase and appropriate amplitude is obtainable.

FIGURE 5 illustrates the effect of the compensating source 50a. The current $I_1$ is the current applied to the load EL during the blocked condition of the transcharger. The current $I_2$, shown by dashed lines, is the compensating current applied to the load by the source 50a. The sum of the two currents is a current of very low value. It is not exactly zero since the ferroelectric elements FE-1 and FE-2 are non-linear and the current passing through these elements therefore is not always exactly equal and opposite to the current passing through the linear element-capacitor 64.

In a circuit built and operated employing the techniques of the circuit of FIGURE 4, the 3-to-1 contrast ratio discussed above was increased to a 10-to-1 contrast ratio. Without the circuit elements 50a and 64, the operating points of the electroluminescent element were at 70 and 72 in FIGURE 3, as discussed above. With the compensating circuit connected, the operating points points were at 74 and 76. As may be observed from the graph, the contrast ratio at the latter two points is approximately 10-to-1, better than a 3-to-1 improvement. The brightnesses at points 74 and 76 were approximately 5 and 0.5 foot lamberts, respectively. This improvement in contrast ratio is obtained at the cost of a reduction of approximately 20% in peak brightness.

In the circuit above, source 50 produced 200 volts r.m.s. at 400 cycles/sec. Source 50a produced 90 volts r.m.s. at the same frequency and in phase synchronism with source 50. The electroluminescent cell employed was type NU401—a commercially available unit. The value of capacitance was 500 picofarads.

An improved circuit is shown in FIGURE 6. Here, rather than employing a capacitor as the coupling element for the source 50a, a second transcharger circuit including ferroelectric elements FE-4, FE-5 and FE-6 is used. The ferroelectric elements FE-4 and FE-5 are essentially in series with the source 50a. The ferroelectric element FE-6 connects a pulse source $X_2$ to the junction C' between the first two ferroelectric elements. The source $X_2$ supplies pulses which maintain the ferroelectric elements FE-4 and FE-5 always polarized in opposite directions and therefore always in the blocked condition.

With the circuit of FIGURE 6, it is possible, in principle, completely to cancel the spurious alternating voltage developed across the electroluminescent element when the ferroelectric elements FE-1 and FE-2 are in the blocked condition. The ferroelectric elements FE-4 and FE-5 have substantialy the same non-linear properties as the ferroelectric elements FE-1 and FE-2. Therefore, the compensating voltage developed across the electroluminescent element EL is always substantially 180° out-of-phase with and always substantially of the same amplitude as the spurious voltage.

FIGURE 7 is the circuit of FIGURE 6 showing the sources 50 and 50a in somewhat more detail and the elements of the circuit somewhat rearranged on the page. The source 50 comprises an alternating voltage source 80 supplying its output to the primary winding 82 of a transformer 84. A portion 88 of the secondary winding supplies its output to the circuit which includes the electroluminescent element EL and the ferroelectric elements FE-1 and FE-2. The portion 90 of the secondary winding supplies its output to the ferroelectric elements FE-4 and FE-5.

The source 50 may be thought of as including the alternating voltage source 80, the primary winding 82 and the secondary winding portion 88. The source 50a may be thought of as including the source 80, the primary winding 82 and the secondary winding 90. Both secondary windings are wound in the same direction. It is clear from the figure that the secondary winding 88 causes a voltage to develop across the electroluminescent element EL in one phase, whereas the winding 90 causes a voltage to develop across the same element in opposite phase. The number of turns in the secondary winding 90 is approximately equal to the number of turns in the secondary winding 88, so that the two voltages developed across the electroluminescent element EL are of substantially the same amplitude when the ferroelectric elements FE–1 and FE–2 are oppositely polarized, that is, are in their blocked state.

In the circuit of FIGURE 7, it is desirable that the point C always remain at substantially ground potential. However, the bridge comprising secondary winding 88, the electroluminescent element EL, and ferroelectric elements FE–1 and FE–2 would be slightly unbalanced if the point F were the center tap of the transformer winding 88. This unbalance is caused by the loading effect of the electroluminescent element. It can be compensated for by placing a compensating load in series with the ferroelectric element FE–2 between this element and point A, as discussed in connection with FIGURE 7 of the copending Lechner application mentioned previously. Alternatively, the bridge may be balanced by connecting point F closer to point A than to point B. Compensation of this type is discussed in connection with FIGURE 6 of the copending application.

With the circuit of FIGURE 6 redrawn as shown in FIGURE 7, the operation of the circuit may be explained in another way. The complete circuit including two secondary windings 88, 90, and the four ferroelectric elements FE–1, FE–2, FE–4, FE–5 can be considered a bridge. The bridge is balanced when the two pairs of ferroelectric elements FE–4, FE–5 and FE–1, FE–2 are both blocked. In this condition of the circuit, point B is at essentially the same potential as point J and therefore no voltage develops across the electroluminescent element EL. On the other hand, when the pair of ferroelectric elements FE–1, FE–2 becomes unblocked, that is, both elements polarized in the same direction, and the ferroelectric elements FE–4, FE–5 remain blocked, the bridge becomes unbalanced. When this occurs, the voltage at joint J differs substantially from the voltage at point B, and the electroluminescent element lights up.

Another form of the present invention is shown in FIGURE 8. Here, the compensating circuit comprises an inductive reactance $X_L$ connected across the ferroelectric elements FE–1 and FE–2. The value of the reactance is so chosen that the current supplied to the load through the reactive path is 180° out-of-phase with and of equal amplitude to the current supplied through the ferroelectric elements, when the ferroelectric elements FE–1, FE–2 are in the blocked condition. This value of reactance is such that the circuit comprising the capacitance of the two ferroelectric elements and the inductance of branch $X_L$ together provide a circuit which is tuned to the frequency of the source 80. The circuit, in other words, is parallel resonant when the elements FE–1, FE–2 are blocked and offers a very high impedance to the source current. In this condition, the source causes very little voltage to develop across the electroluminescent element. On the other hand, when the ferroelectric elements are unblocked, the resonant circuit becomes detuned and a substantial voltage develops across the electroluminescent element.

In the circuit of FIGURE 8, $X_L$, if simulated only by an inductance, will be of relatively high value. If desired, a smaller value of inductance may be employed in shunt with a capacitance. Also, added compensation may be achieved by employing a non-linear reactive element such as an inductance wound on an iron core, or other non-linear inductive material.

While not shown, it is to be understood that the various circuits of the present invention are normally arranged in an XY matrix to make up a display, such as a panel-type display. So arranged, a single source, corresponding to 50 and/or 50a may be common to all elements of the array. The source may, for example, be connected through interconnected primary windings to secondary windings of the rows in the array. It is also to be understood that while by way of example the X and Y pulse sources are stated to provide pulses of a given polarity, the circuit operation is the same when the polarities of all pulses are reversed. Finally, it is to be understood that while various values of circuit elements and other parameters are given to illustrate the invention, these are provided only by way of example and are not to be taken as limiting the scope of the invention.

What is claimed is:
1. In combination:
 a bridge network having four legs, the first leg including a first pair of ferroelectric elements normally in the blocked condition, the second leg including a second pair of ferroelectric elements, and the third and fourth legs comprising together an alternating voltage source, the respective voltages provided by the third and fourth legs being such that in the blocked condition of both pairs of ferroelectric elements, the connection between the first and second legs is at substantially the same alternating voltage as the connection between the third and fourth legs;
 a load element connected between the connection of the first and second legs and the connection of the third and fourth legs;
 an X voltage pulse source coupled to the second leg of said bridge network between the two ferroelectric elements thereof; and
 a Y voltage pulse source coupled to the third leg of said bridge network for applying a voltage pulse to said third leg for switching the two ferroelectric elements therein between their blocked condition in which they exhibit a relatively high impedance and their unblocked condition in which they exhibit a relatively low impedance solely when said voltage pulse applied by said Y voltage source is concurrent with the voltage pulse applied by said X voltage source.

References Cited
UNITED STATES PATENTS

| | | | |
|---|---|---|---|
| 2,892,968 | 6/1959 | Kallmann et al. | 315—169 |
| 3,059,147 | 10/1962 | Sack | 315—176 |
| 3,247,390 | 4/1966 | Kazan | 315—151 |

JOHN W. HUCKERT, *Primary Examiner.*

J. D. CRAIG, *Assistant Examiner.*